United States Patent [19]

Dietz

[11] Patent Number: 5,253,686
[45] Date of Patent: Oct. 19, 1993

[54] PROCESS AND DEVICE FOR SEPARATING OR SLITTING A RIGID MATERIAL

[75] Inventor: Hans Dietz, Ammerbuch, Fed. Rep. of Germany

[73] Assignee: Wurster u. Dietz GmbH u. Co. Maschinenfabrik, Tubingen-Derendingen, Fed. Rep. of Germany

[21] Appl. No.: 898,504

[22] Filed: Jun. 15, 1992

[30] Foreign Application Priority Data

Jun. 18, 1991 [DE] Fed. Rep. of Germany ....... 4120096
Jun. 26, 1991 [DE] Fed. Rep. of Germany ....... 4121021

[51] Int. Cl.$^5$ .................. B27G 19/08; B26D 7/08
[52] U.S. Cl. ................... 144/363; 83/102.1; 83/105; 144/369
[58] Field of Search ............. 83/102.1, 105, 676, 83/871, 872; 144/2 R, 182, 193 R, 363, 366, 369

[56] References Cited

U.S. PATENT DOCUMENTS 4,896,708  1/1990  Dietz ................... 83/102.1
5,146,964  9/1992  Dietz ................... 144/369

Primary Examiner—W. Donald Bray
Attorney, Agent, or Firm—Poms, Smith, Lande & Rose

[57] ABSTRACT

A method and an apparatus are disclosed for separating or slitting a rigid material, in particular a piece of wood, having a modulus of elasticity of between 50,000 and 400,000 kg/cm$^2$. A narrow tool having chip-removing elements, in particular a circular saw blade, produces a slot or kerf of finite width in the material at a cutting speed of more than 40 m/s. After the chip-removing elements having passed, a separator element bends a side piece out of the slot plane so that after the chip-removing elements have passed, the side piece is always at a distance from the tool. When viewed along the feed direction of the material, the separator element is provided with a hump at a distance from its periphery adjoining the tool and being first to come into contact with the material when the material is fed in. An imaginary connection line extending between the hump and the chip-removing elements is at a distance above a first portion of the separator element lying between the hump and the periphery.

20 Claims, 6 Drawing Sheets

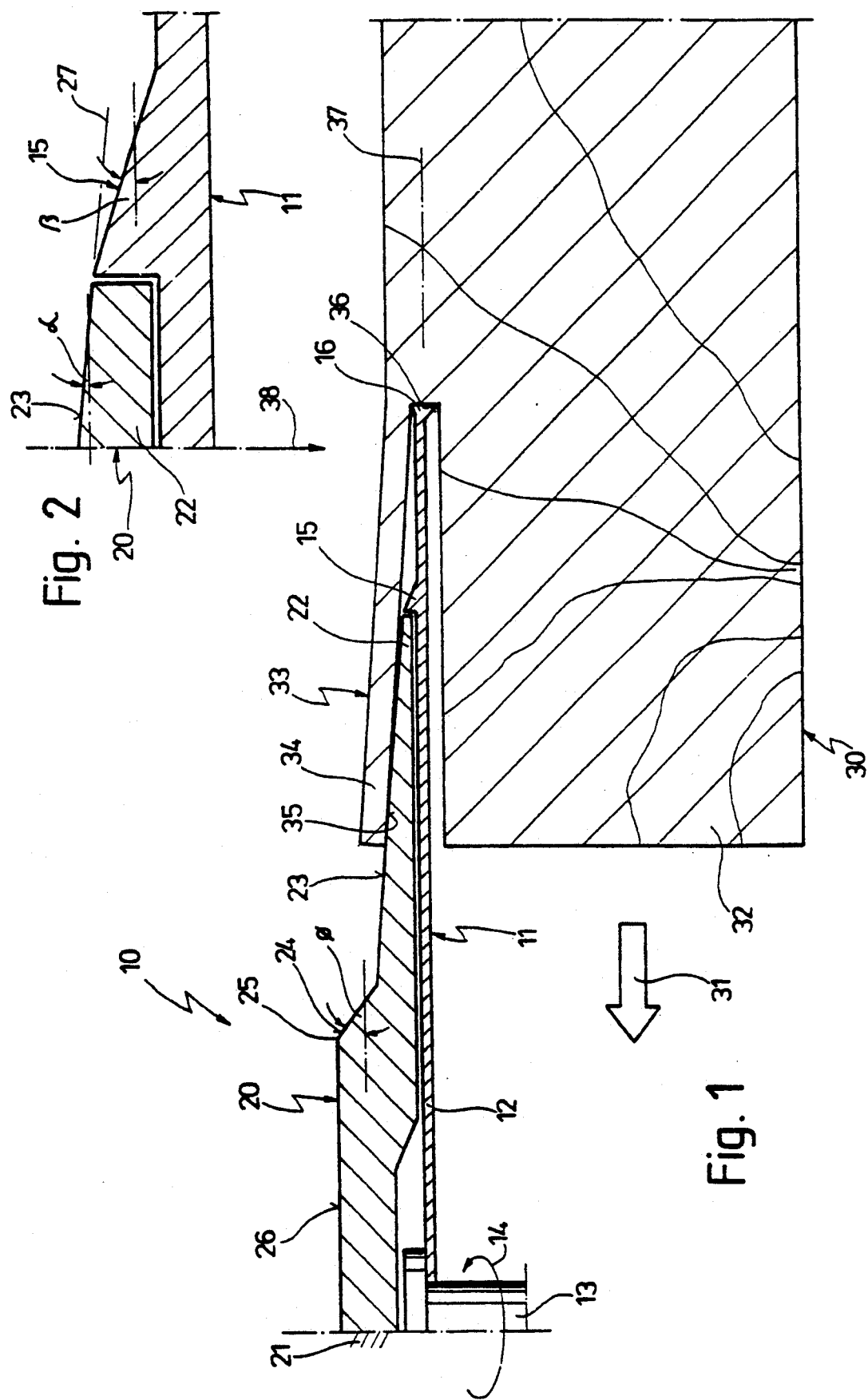

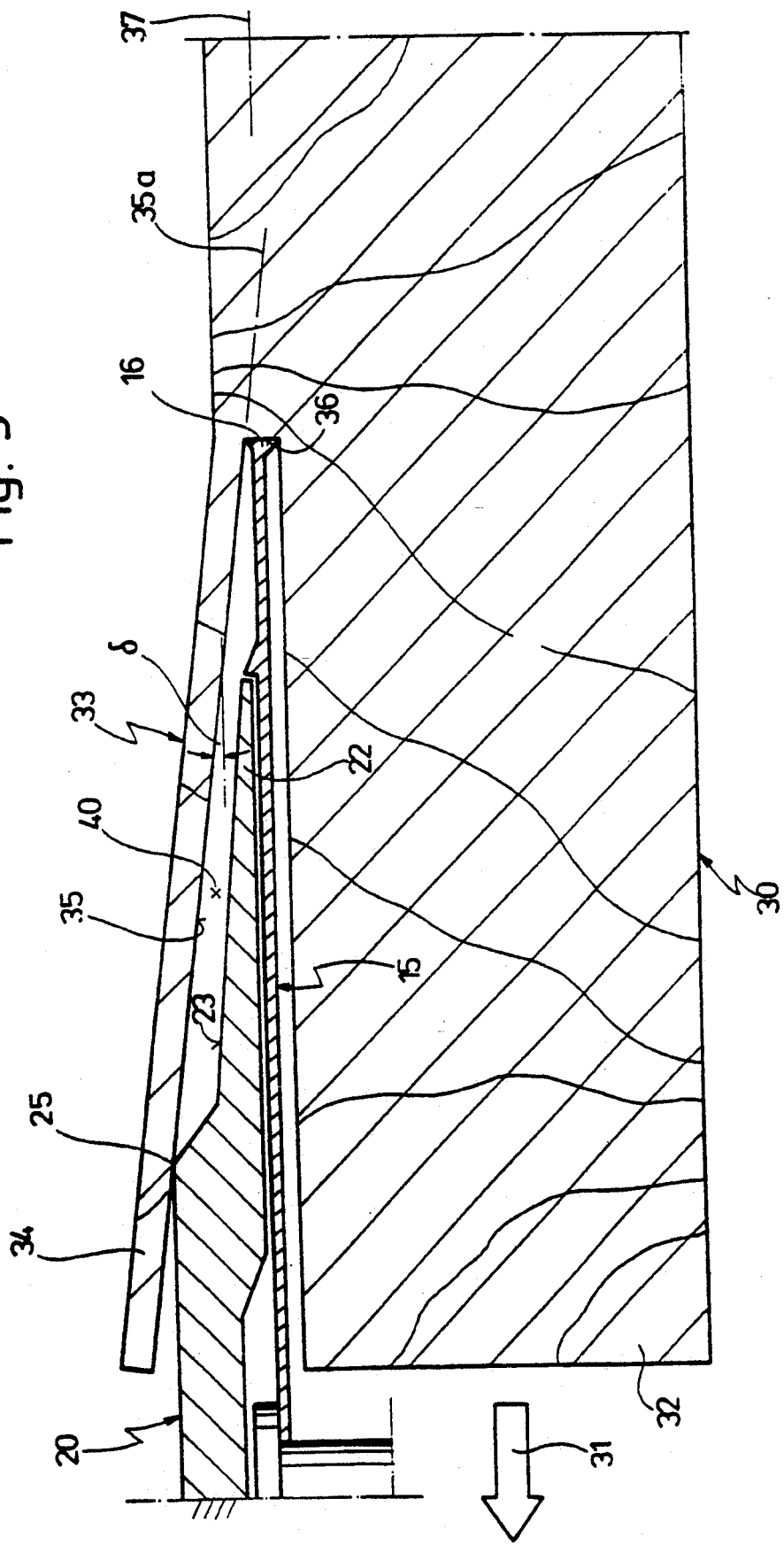

PROCESS AND DEVICE FOR SEPARATING OR SLITTING A RIGID MATERIAL

The invention concerns a process for separating or slitting a rigid material, especially wood, with a modulus of elasticity of preferably approximately 50,000 to 400,000 kg/cm$^2$, in which a narrow tool having chip-removing elements, especially a circular saw blade, produces a kerf of finite width in the material at a cutting speed of more than approximately 40 m/s; and after the chip-removing elements have passed, a side piece is deflected out of the kerf plane away from the main piece of the material, by means of a wedge-like stationary separator element, in such a way that after the chip-removing elements have passed, the side piece is always spaced away from the tool.

The invention further concerns a device for separating or slitting a rigid material, especially wood, with a modulus of elasticity of preferably approximately 50,000 to 400,000 kg/cm$^2$, with a narrow tool having chip-removing elements, especially a circular saw blade, which produces a kerf of finite width in the material at a cutting speed of more than approximately 40 m/s, and with a wedge-like stationary separator element which, after the chip-removing elements have passed, deflects a side piece out of the kerf plane away from the main piece of the material in such a way that after the chip-removing elements have passed, the side piece is always spaced away from the tool.

A process and device of the aforesaid type are known from WO 88/02683.

The description that follows will focus on the example in which wood is separated or slit by a circular saw. It is self-evident, however, that the invention is not confined to this application, but rather that other materials as well, for example plastics whose moduli of elasticity lie in the range described above, can be processed; and it is further self-evident that tools other than circular saw blades can also be used, for example narrow chipping heads, bandsaws, and others.

The purpose of the known process and the known device is to reduce the thermal load on the circular saw blade created by friction of the wood against the circular saw blade. With conventional circular saws there always existed the problem that the cut wood remained in contact with the rotating circular saw blade over a comparatively long travel length, with the result that considerable heat was produced due to friction between the circular saw blade and the wood. This shortcoming was eliminated by the known device and the known process.

In the context of the known process and with reference to the known device, an attempt has now been made to optimize sawing characteristics even further by developing a certain conformation for the separator element. For example, with the known device is was proposed that the separator element be shaped so that its contact surface against the separated side board corresponds exactly to the natural bending line of the separated side board. One of the purposes was for the separated side board to contact the separator element at a constant pressure over its length.

However, practical experiments, especially long-term experiments on the order of several kilometers of sawed length, have shown that the conformations for the separator element previously considered do not yet represent the optimum that is achievable. For example, although with the known conformations the work of friction between tool and wood is already drastically reduced compared to conventional saws without a separator element, nonetheless when a saw with separator element is used for long-term operation, in which for example ten or twenty kilometers of wood need to be sawed continuously, even the relatively low residual work of friction between the separated wood and separator element can lead to locally excessive stresses on the separator element.

The underlying object of the invention is therefore to develop a process and a device of the aforesaid type in such a way that the residual work of friction between the separated side piece and separator element is reduced even further.

In accordance with the aforesaid process, this object is achieved, in accordance with the invention, by the fact that when the material is fed into the tool, the side piece is first bent at its tip through a smaller angle, and then, first at the tip and then over its entire further length, at a greater angle, in such a way that after the transition to the greater angle, the side piece maintains a clearance with respect to the surface of a first, outer section, contiguous to the tool, of the separator element.

In accordance with the aforesaid device, this object is achieved by the fact that the separator element, when viewed along the feed direction of the material, is provided, at a distance from its periphery, which is contiguous to the tool and is first to come into contact with the material when the material is fed in, with a hump; and that an imaginary connecting line runs between the hump and the chip-removing elements at a distance above a first section of the separator element lying between hump and periphery.

The object underlying the invention is entirely achieved in this manner.

Specifically, the wood being fed into the tool is, in the region of the tip of the separated side board, first raised through the smaller angle and deflected relatively slightly out of the kerf plane. As soon as the tip then runs onto the hump, the side board is practically abruptly deflected again out of the separation plane through a further angle, with this greater bending angle then being maintained for all further sawing of the material being continually fed in. The separated side board then slides only on the surface of the hump, while the region between the hump and the teeth of the circular saw blade is bridged by the separated side board; and because of the spacing existing there, no contact occurs between the separated side board and separator element.

Considering that the feed speed for these applications is more than 1 m/s, and the distance between the teeth and the hump, viewed along the feed direction of the material, is approximately ten centimeters, it is evident that the time spent by the separated side board on the outer periphery of the separator element, before ultimately being deflected more sharply by the hump, is only a few tenths of a second.

The mechanical and therefore thermal loads on the outer regions of the separator element are thus limited to minimal time periods that have no practical effect. Instead, the result of the invention is that in continuous operation, mechanical stress on the separator element is confined to the region of the hump, the conformation of which can be optimized from a number of viewpoints. Other protective measures, for example cooling, surface coating, and the like, are also more easily possible in the vicinity of the hump, since the separator element is thicker there and is therefore better suited for such additional design features than in the relatively narrow circumferential rim of the separator element.

Practical experiments have shown that the service life of a device in accordance with the invention, with a hump of optimized conformation, is of entirely the same order of magnitude as the service life of conventional circular saws without a separator element.

In a preferred embodiment of the process in accordance with the invention, the smaller angle is between 1° and 10°, and preferably it is 4°. On the other hand it is preferred if the greater angle is between 3° and 12°, and is preferably 6°.

With the device in accordance with the invention, the preferred exemplary embodiments are those in which the separator element is arranged on a circular saw blade and is designed essentially in the form of a circular disk. The engagement region of the circular saw and the separator element in the form of a circular disk has the shape of a segment of a circle.

In accordance with the invention, it is preferred if, viewed along the feed direction of the material, three sections of the separator element are adjacent to one another in the engagement region. All three sections are preferably provided with a surface whose shape corresponds to a surface singly curved in space, with the entire surface enclosing a certain angle with the kerf plane; furthermore, the radius of curvature of the surface runs perpendicular to the feed direction of the material; and lastly, the curvature of the surface decreases from outside to inside in a direction inside the kerf plane, but perpendicular to the feed direction.

It is preferable in this connection if the first section has a first angle between 1° and 10°, preferably 4°, while a second angle of the second section is between 5° and 30°, and preferably is 15°. Lastly, the third section preferably runs parallel to the separation plane, so that its angle of inclination is 0°.

The result of this is that the side board being fed in is initially deflected at its tip on the first, less inclined section, then runs onto the second, much more sharply inclined section, and lastly is deflected at its upper delimiting edge, namely the hump, for its subsequent course. The deflection process occurs two-dimensionally, by the fact that on the one hand the side board is deflected in the feed direction out of the separation plane, but on the other hand is also deflected perpendicular to the feed direction, namely in the engagement direction of the circular saw blade.

The conformation of the separator element just described results in optimum stability for the separator element, especially for the hump in the transition from the second to the third section.

This optimum conformation is especially present when the transition from the first to the second section is a line that runs perpendicular to the feed direction and/or when the transition between the second and third section constituting the hump has a linear profile, with the line running at a constant, third angle to the feed direction. Lastly, an optimum effect is achieved if the transition and the hump intersect at the periphery of the separator element.

Practical experiment have shown that this conformation leads to optimum results.

Further advantages are evident from the description and the attached drawings.

It is self-evident that the features mentioned above and those yet to be explained below can be used not only in the particular combination indicated, but also in other combinations or in isolation, without leaving the context of the present invention.

Exemplary embodiments of the invention are depicted in the drawing and are explained in more detail in the description which follows. In the drawings:

FIG. 1 shows a side view, in section, through an exemplary embodiment of the invention, viewed along line I—I of FIG. 5;

FIG. 2 shows a portion of FIG. 1 at greatly enlarged scale;

FIG. 3 shows a depiction similar to FIG. 1, but for another phase of a separation or slitting procedure;

Figure 4:
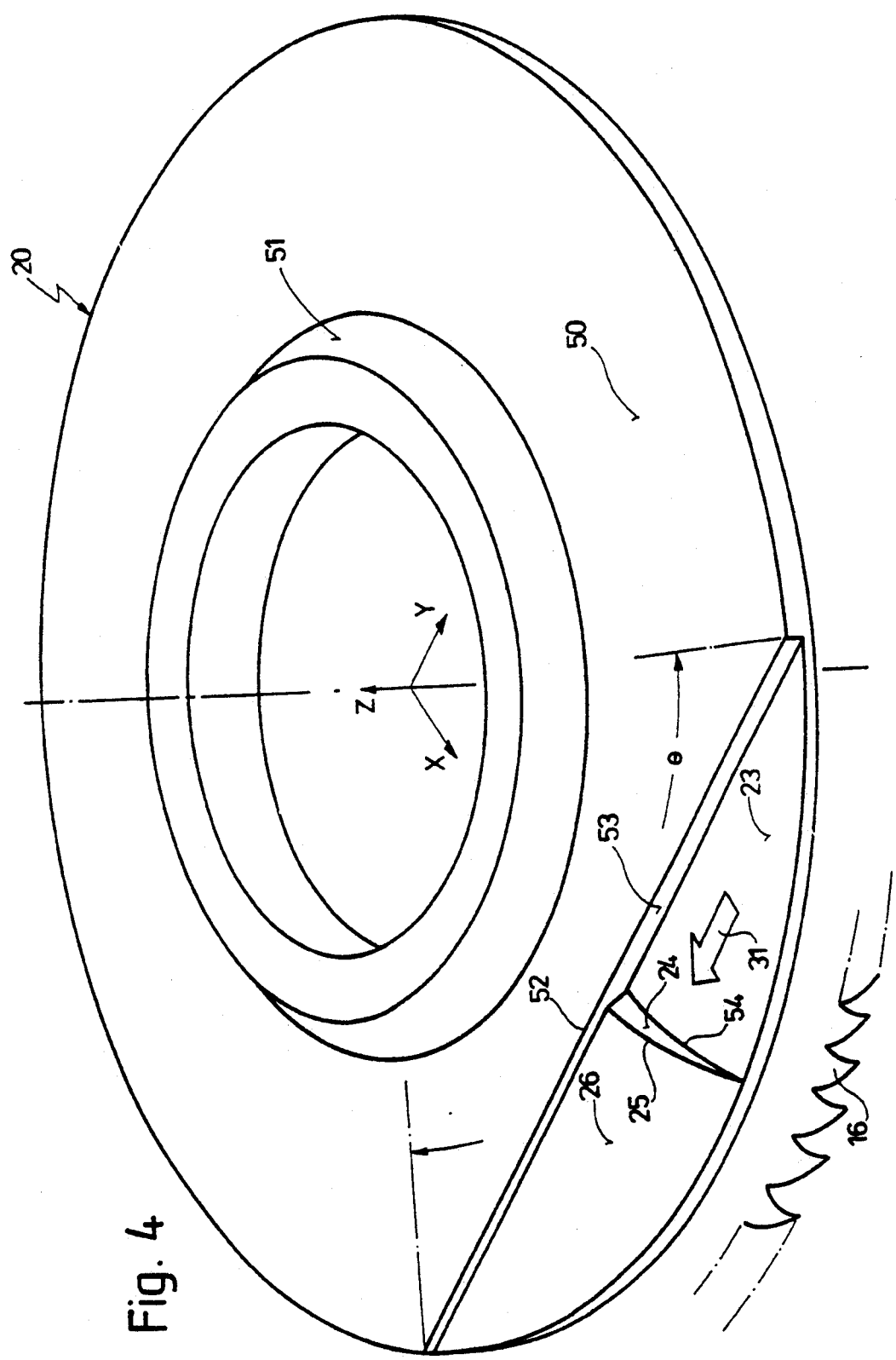
FIG. 4 shows a perspective view, highly schematized, of an exemplary embodiment of a separator element that can be used in the context of the present invention.

In FIG. 1, 10 designates the totality of a circular saw. The circular saw 10 has a circular saw blade 11 which is provided, in the region near the axis, with a section 12. The numeral 13 indicates a drive shaft for the circular saw blade 11, and 14 is an arrow symbolizing the fact that the circular saw blade 11 rotates during operation.

In the vicinity of the periphery, the circular saw blade 11 is provided with a circumferential rim 15 of known design, whose function will be discussed later on. Lastly, the circular saw blade 11 is provided, in the usual manner, with teeth 16 at its periphery.

Coaxially with the circular saw blade 11, the circular saw 10 is provided with a separator element 20 approximately in the form of a circular disk. The numeral 21 indicates that the separator element 20 is fastened in a stationary manner, i.e. does not rotate along with the circular saw blade 11.

A periphery 22 of the separator element 20 conforms to the inside of the raised rim 15 of the circular saw blade 11. Leading radially inward from the periphery 22 is firstly a first inclined section 23, adjacent to which is then a second inclined section 24. The second inclined section 24 ends at its upper edge in a hump 25. The hump 25 then continues radially inward into a third, flat section 26.

The numeral 30 designates a wood product, for example a block, that is processed in ordinary sawmills. An arrow 31 identifies the feed direction of the wood product 30, from right to left as depicted in FIG. 1.

Engagement of the circular saw 10 in the wood product 30 leaves behind a thicker main piece 32, and a side piece 33, for example a side board, is separated from the main piece 32 at the side. The side piece 33 thus runs, at its tip 34 or its underside 35, onto the first inclined section 23, and is thereby deflected away from the kerf 36 and the kerf plane 37. The numeral 38 symbolizes a pressure element that can act laterally on the side piece 33 in the vicinity of the kerf 36, to prevent undesired advancement of the kerf against the feed direction 31.

FIG. 1 shows the situation in which the wood product 30 is just being fed into the region of the circular saw 10. As a result, the tip 34 of the side piece is initially deflected only slightly out of the kerf plane 37, since at the first moment of engagement, the tip 34 is in contact with the first section 23 which has a relatively low inclination.

The enlarged depiction of FIG. 2 shows that the rim 15 of the circular saw blade 11 is provided with an approach bevel whose angle β can be in the region between 10° and 60°. The transition between the upper edge of the rim 15 and the periphery 22 of the separator element 20 is then almost continuous. The said element is, as already mentioned several times, at a shallow inclination in this region, with the corresponding first section 23 having an angle of inclination α of preferably 5°.

The arrangement can be such that an imaginary connecting line 27 between the upper edge of the rim 15 and the teeth 16 runs exactly along the continuation of the inclination of the first section 23, so that the tip 34 of the side piece 33 lies with its underside 35 exactly parallel to the connecting line 27. It is also possible, however, for the tip 34 to be in contact essentially in the region of its front end with the first inclined section 23.

In each case further feeding causes the lip 34 of the side piece 33, having traversed the first section 23, to run onto the more steeply inclined section 24. Its angle of inclination Φ is preferably 15°; note that the depictions of FIGS. 1 to 3, like the depictions of the other Figures, are not to scale, but that occasionally exaggerated depictions were selected for purposes of better comprehension.

If a situation in accordance with FIG. 3 is then reached, in which the tip 34 of the side piece 33 has passed over the hump 25, the side piece 33 is thus entirely lifted away from the outer sections 23 and 24 of the separator element 20, as is clearly evident in FIG. 3 in the form of a clearance 40. Thus from the moment at which the tip 34 has passed the hump 25, the side piece extends in such a way that the underside 35 extends along a connecting line 35a between the hump 25 and the teeth 16.

As is clearly evident from a comparison of FIGS. 1 and 3, this means that as the wood product 30 is fed in, the side piece 33 is deflected only slightly at the first instant, in other words as long as the tip 34 is running on the first section 23 of the separator element 20. By passing onto the second section 24, the side piece 33 is then abruptly deflected through an additional defined angular step, so that from now on the side piece 33 is deflected at a greater angle out of the kerf plane 37, as indicated by an angle δ in FIG. 3. The angle δ is preferably between 5° and 10°. It is self-evident, however, that this angle indication and the other angle indications are to be understood only approximately, and can be optimized in individual cases.

FIGS. 4 through 7 depict the conformation of sections 23, 24, and 26 once again in detail.

FIG. 4 shows the separator element 20 in its entirety, and it is evident that it has an outer flat region 50 that rises in a slightly conical manner towards the inside, where it merges into a reinforced flange region 51.

The engagement region of the separator element 20 is defined by an edge 52 that defines a region shaped like a segment of a circle. This region corresponds to a central angle θ of, for example, 90°.

As is clearly evident from FIG. 4 to 7, the sections 23, 24, and 26 lie somewhat below the flat region 50 of the separator element 20, which is manifested in a step 53 below the edge 52. Located between the first section 23 and the second section 24 is a linear transition 54, while the transition from the second section 24 to the third section 26 is constituted by the linear hump 25, which is also linear. The two lines intersect at the periphery of the separator element 20. In the top view in FIG. 5, it is clearly evident that the transition 54 runs exactly at right angles to the feed direction 31, while the hump is inclined at an angle ε to the transition 54, with the angle ε preferably being approximately 15°.

Figure 5:
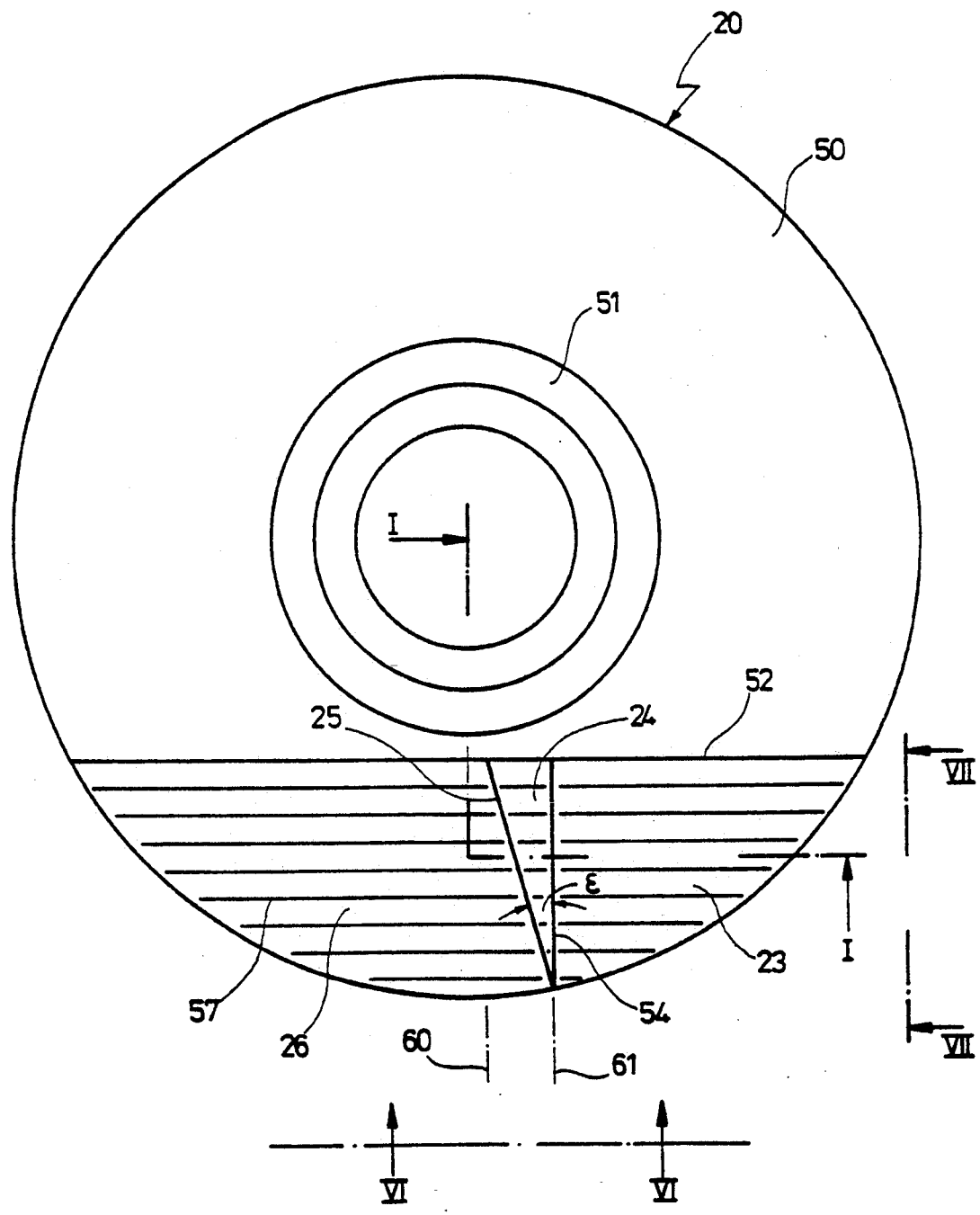
FIG. 5 shows a top view of the separator element depicted in FIG. 4.
Figure 6:
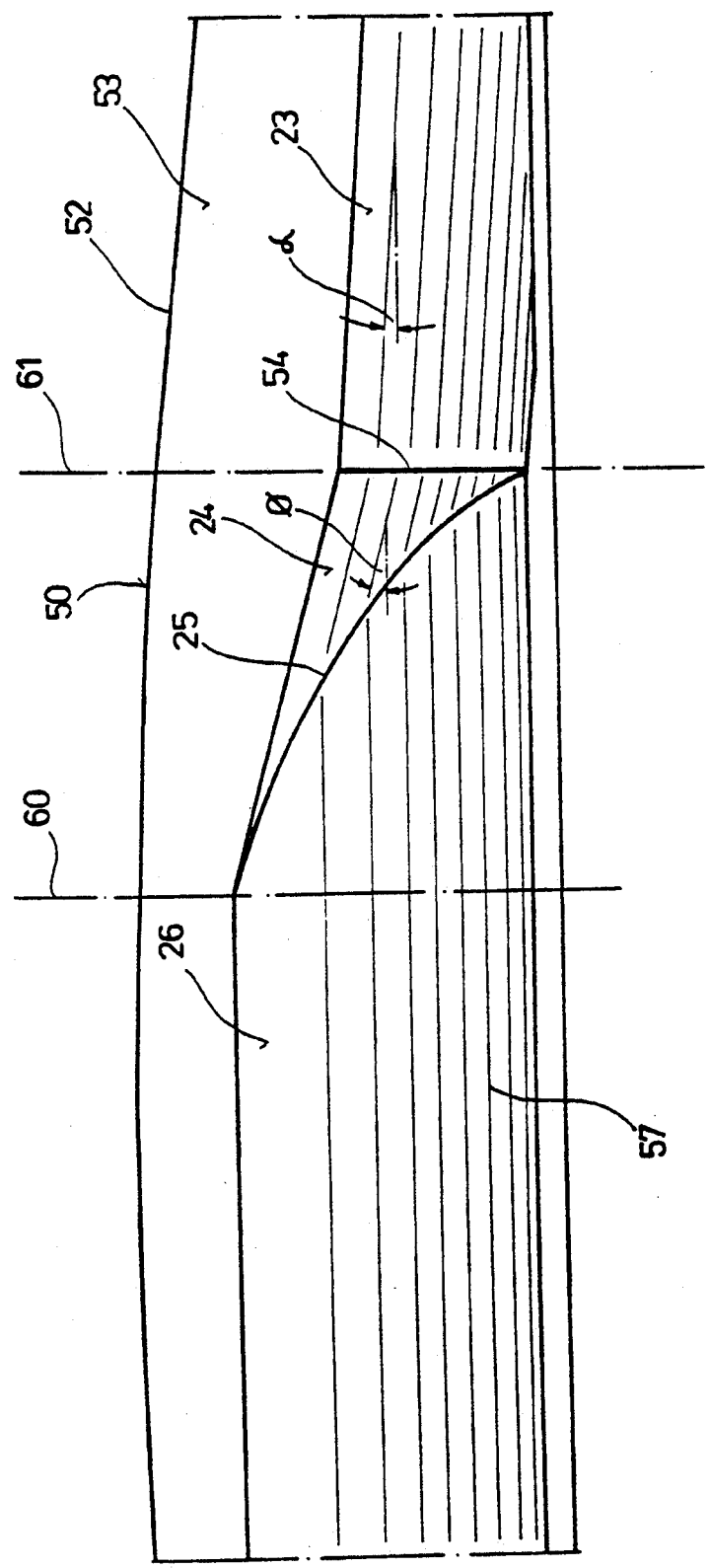
FIG. 6 shows a side view along line VI—VI in FIG. 5, but at greatly enlarged scale.
Figure 7:
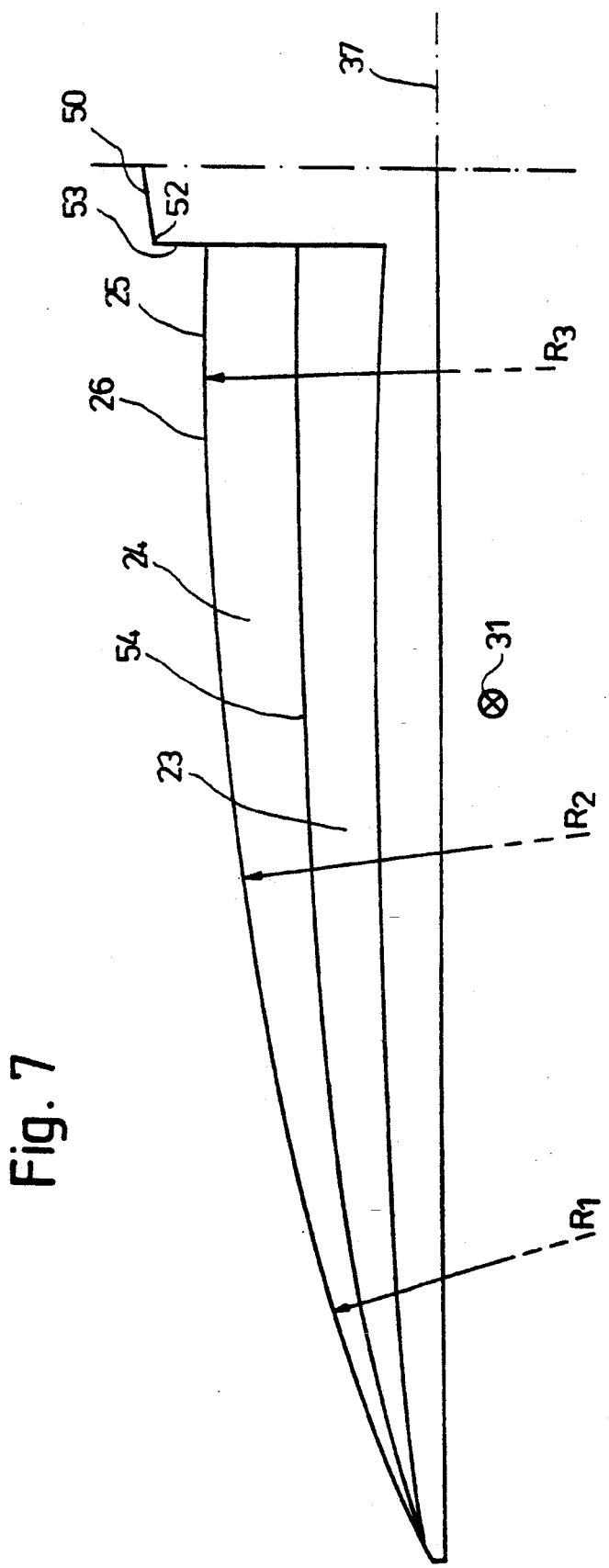
FIG. 7 shows a side view along line VII—VII of FIG. 5, again at enlarged scale.

The numeral 57 is used to denote, in FIGS. 5 and 6, elevation lines for those surfaces that are formed by the sections 23, 24, and 26.

This indicates that the surfaces of the sections 23, 24, and 26 are flatter in the vicinity of the edge 52, and become steeper towards the periphery of the separator element 20. This is clearly evident from FIG. 7, where in a side view, the profiles of the surfaces and of the transition 54 and the hump 25 (again not to scale) are evident. For the hump 25, in FIG. 7 the radii of curvature $R_1$, $R_2$, and $R_3$, in the vicinity of the periphery, at the center, and in the vicinity of the edge 52, are depicted. The values of the radii of curvature $R_1$, $R_2$, and $R_3$ increase towards the inside, i.e. towards the edge 52.

Altogether, this means that upon encountering the sections 23, 24, and 26 in succession, the side piece 33 is two-dimensionally deflected out from the kerf plane 37, namely on the one hand through the inclination angles α and Φ in a direction upward out of the kerf plane 37, but also, on the other hand, because of the curvatures of the surfaces of sections 23, 24, and 26, perpendicular thereto, i.e. about the feed direction 31.

I claim:

1. A method of cutting wood, comprising the steps of:
   selecting an elongate piece of wood having a modules of elasticity between 50,000 and 400,000 kg/cm$^2$;
   cutting an elongate slot into said piece of wood using a circular saw blade having a plurality of spaced peripheral cutting teeth at a cutting speed exceeding 40 m/s, thereby dividing said piece of wood into a first and a second section; and
   bending said first section away from said slot by means of a wedge-like stationary separator element to lift off said first section from said saw blade immediately after the formation of said slot, wherein, when said piece of wood comes into contact with said saw blade, a top of said cut first section is first bent by means of a stationary raised rim adjacent said teeth about a first angle (α) away from said slot and, thereafter, by means of a stationary inclined separator element section about a second angle (δ) greater than said first angle (α), such that, after transition from said first angle (α) to said second angle (δ) said first section is entirely arranged at a distance from a first outer portion of said separator element arranged between said raised rim and said inclined separator element section.

2. The method according to claim 1, wherein said smaller angle (α) is between 1° and 10°.

3. The method according to claim 2, wherein said smaller angle (α) is 4°.

4. The method according to claim 1, wherein said greater angle (δ) is between 3° and 12°.

5. The method according to claim 4, wherein said greater angle (δ) is 6°.

6. An apparatus for cutting elongate pieces of wood, said pieces of wood having a modulus of elasticity between 50,000 and 400,000 kg/cm$^2$, comprising:

a circular saw blade having a plurality of spaced peripheral cutting teeth;

drive means for rotating said saw blade about an axis at a cutting speed of said teeth exceeding 40 m/s; and stationary bending means arranged on a broad side of said circular saw blade and having an edge adjoining said cutting teeth, wherein said bending means, when viewed along a feed direction of said piece of wood, is provided with a hump at a distance from its periphery adjacent said teeth and coming first into contact with said piece of wood when said piece of wood is fed in, and wherein an imaginary connection line running between said hump and said teeth is at a distance above a first portion of said bending means lying between said hump and said periphery.

7. The apparatus according to claim 6, wherein said first portion of said bending means is provided with a monomially warped surface, said surface being entirely inclined at a first angle ($\alpha$) to said saw blade broad side, wherein, further, said surface has a radius of curvature extending perpendicularly to said feed direction of said piece of wood and, wherein, said radius of curvature increases from outside to inside in a direction perpendicular to said feed direction.

8. The apparatus according to claim 7, wherein said first angle ($\alpha$) is between 1° and 10°.

9. The apparatus according to claim 8, wherein said first angle ($\alpha$) is 4°.

10. The apparatus according to claim 6, wherein said first portion merges via a linear transition into a second portion of said bending means, said second portion being provided with a second monomially warped surface, said second surface being inclined at a second angle ($\Phi$) to said saw blade broad side, a second radius of curvature of said second surface extending perpendicularly to said feed direction of said piece of wood, and wherein said second radius of curvature increases from outside to inside in a direction perpendicular to said feed direction, said second portion merging into said hump in said feed direction.

11. The apparatus according to claim 10, wherein said transition is a line extending perpendicularly to said feed direction.

12. The apparatus according to claim 10, wherein said second angle ($\Phi$) is between 5° and 20°.

13. The apparatus according to claim 12, wherein said second angle ($\Phi$) is 15°.

14. The apparatus according to claim 6, wherein a third portion of said bending means is arranged adjacent to said hump in said feed direction, said third portion being provided with a third monomially warped surface, said third surface enclosing a third angle with said saw blade broad side, a third radius of curvature of said third surface extending perpendiculary to said feed direction of said piece of wood, and wherein said first radius of curvature increases from outside to inside in a direction perpendicular to said fee direction.

15. The apparatus according to claim 14, wherein said third angle is 0°.

16. The apparatus according to claim 10, wherein said transition between said second portion and said third portion constituting said hump has a line profile with said line extending at a constant fourth angle ($\epsilon$) to said feed direction.

17. The apparatus according to claim 16, wherein said fourth angle ($\epsilon$) is between 83° and 73°.

18. The apparatus according to claim 17, wherein said fourth angle is 78°.

19. The apparatus according to claim 11, wherein said transition and said hump intersect at said periphery of said bending means.

20. The apparatus according to claim 6 wherein said bending means includes a first inclined section leading radially inward from the periphery thereof to a second inclined section extending upwardly and away from aid first inclined section terminating at its upper edge in said hump, said hump then continuing radially inward from the periphery of said bending means to a third flat section of said bending means.

* * * * *